Dec. 8, 1931.  A. J. HOLMAN  1,835,159
OPERATING MECHANISM FOR THE FIRE SHUTTER OF MOVING PICTURE PROJECTORS
Filed May 6, 1927  3 Sheets-Sheet 1
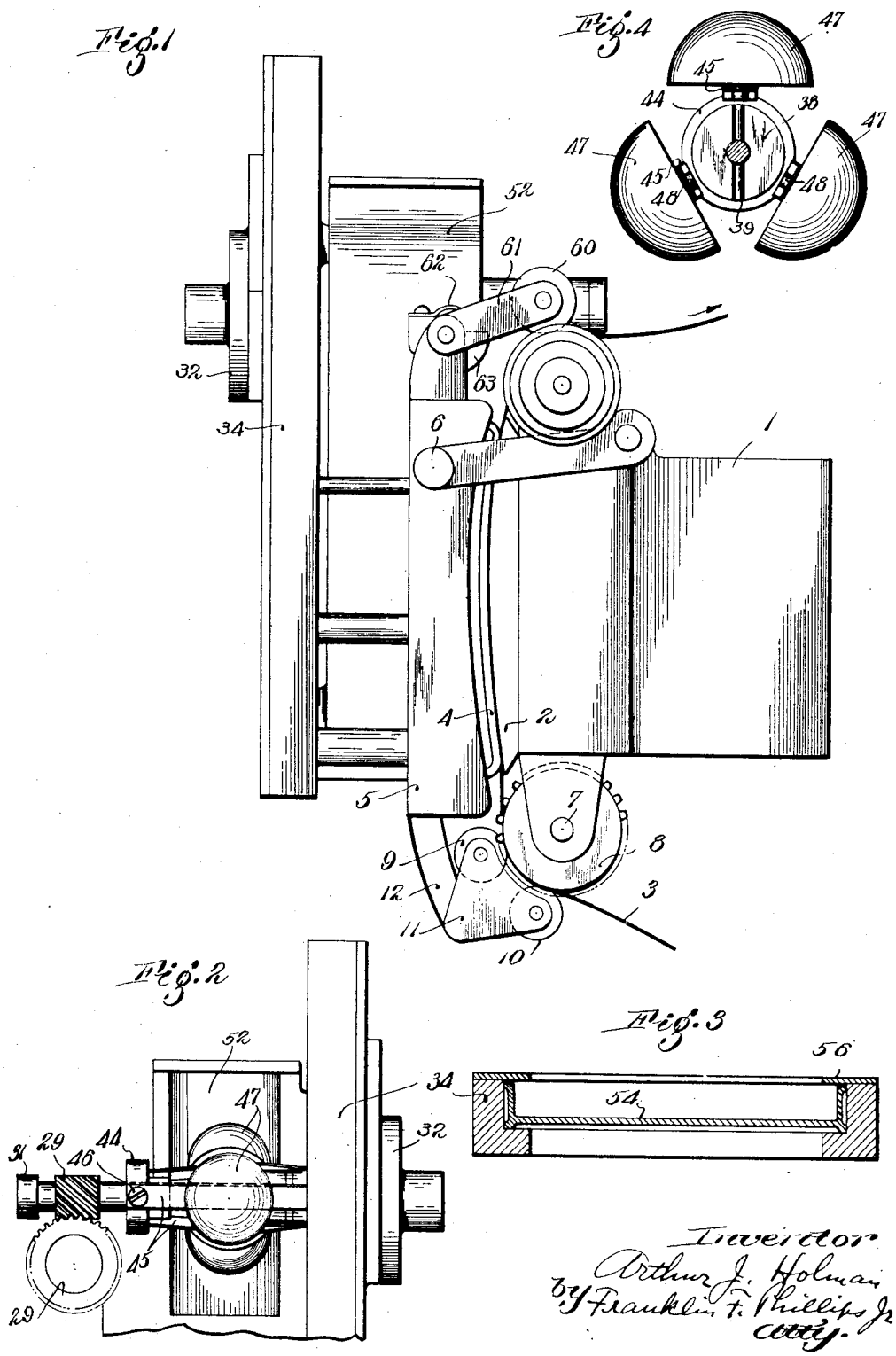

Dec. 8, 1931.  A. J. HOLMAN  1,835,159
OPERATING MECHANISM FOR THE FIRE SHUTTER OF MOVING PICTURE PROJECTORS
Filed May 6, 1927  3 Sheets-Sheet 2
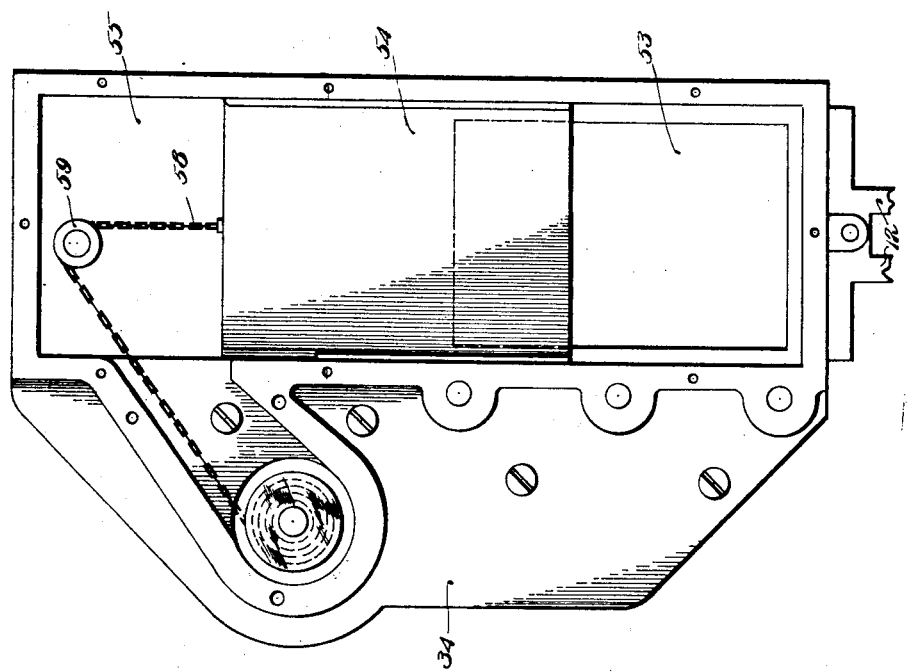
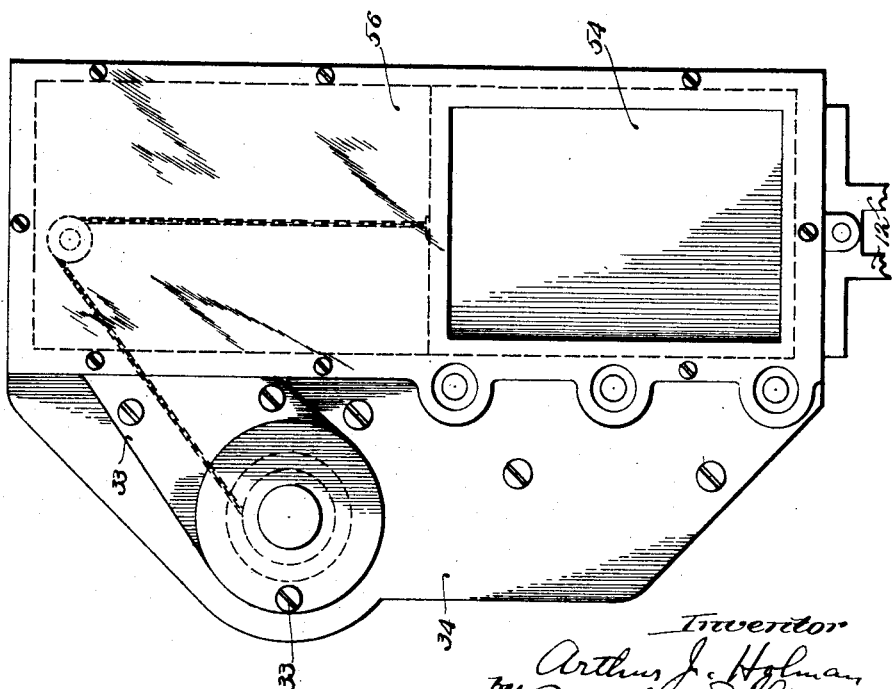

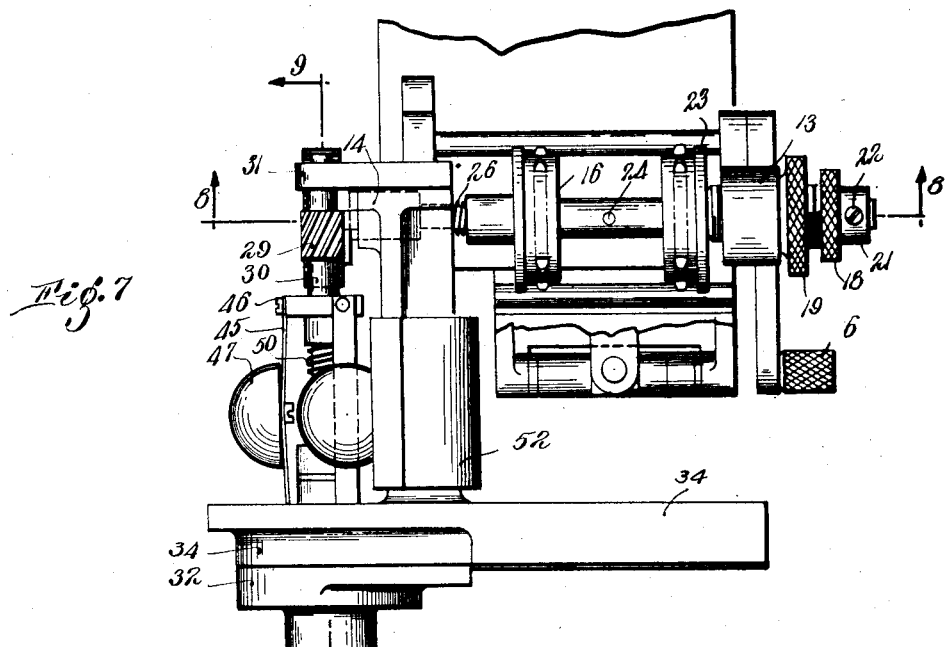
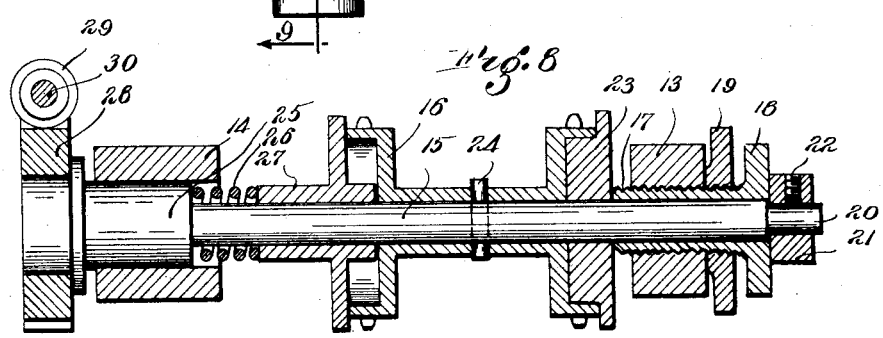
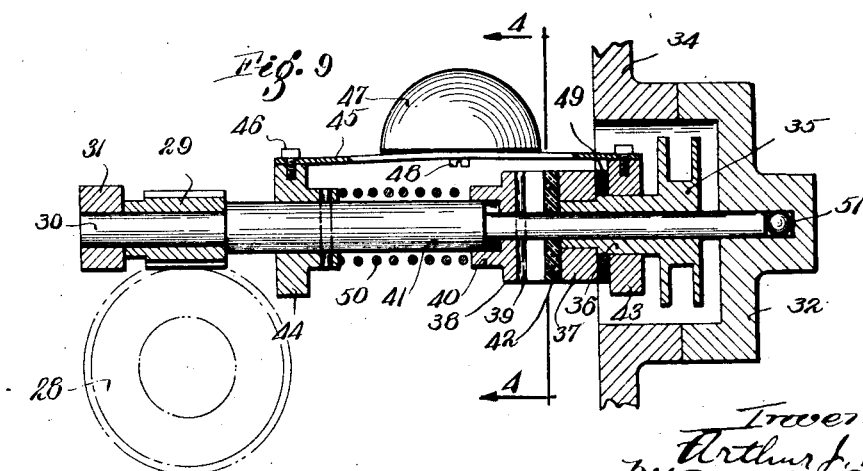

Patented Dec. 8, 1931

1,835,159

UNITED STATES PATENT OFFICE

ARTHUR J. HOLMAN, OF BOSTON, MASSACHUSETTS

OPERATING MECHANISM FOR THE FIRE SHUTTER OF MOVING PICTURE PROJECTORS

Application filed May 6, 1927. Serial No. 189,343.

My device relates more particularly to an automatic fire shutter control mechanism for a moving picture projector wherein the film strip is constantly in motion across the aperture as distinguished from the so-called intermittent type of projector. Heretofore it has been the practice in connection with the automatic fire shutter control mechanism of moving picture projectors to connect their driving mechanism with the main driving apparatus which operates the film driving sprocket; but my device is designed to be driven by the movement of the film itself so that if a break occurs in any part of the film strip lying across the aperture, and above the film driving sprocket, that part of the film strip which is actuating my device will come to rest and thereby cause the immediate closing of the fire shutter. Thus is eliminated all possibility of fire hazard because of the presence of a portion of the film above the break and within the aperture. This feature constitutes an advantage over the common practice whereby the shutter is closed only by the intended stopping of the main driving apparatus of the projector and is unaffected by accidental breakage of the film.

It has been the further object of my invention to so design and construct my device that the stress to which the device subjects the film may be so controlled automatically that there is never risk of doing damage to the film regardless of projection speed.

My device may be best understood by reference to the accompanying drawings in which Fig. 1 is a side view of an aperture unit of the type shown in my Patent No. 1,584,098 dated May 11, 1926 for a continuous projector, which aperture unit has mounted thereon a fire shutter and my improved automatic control mechanism.

Fig. 2 is a view of a part of the side of my device opposite that shown in Fig. 1, which shows the centrifugal weights and adjacent parts.

Fig. 3 is a cross section showing the fire shutter and the frame wherein it is slidably mounted.

Fig. 4 is a view on line 4—4 of Fig. 9 showing the centrifugal weights and the yielding friction drive collar which yields under the pressure produced by the movement of said centrifugal weights.

Fig. 5 is a rear view of the fire shutter frame showing the fire shutter mounted therein in closed position.

Fig. 6 is a view similar to Fig. 5 except that the rear cover plate and pulley shaft bearing cap have been removed, and the fire shutter is shown in a partly raised position.

Fig. 7 is a top view of my device, partly broken away to show the fire shutter mechanism driving sprocket.

Fig. 8 is a cross section on line 8—8 of Fig. 7, showing the sprocket shaft and parts associated therewith.

Fig. 9 is a cross section on line 9—9 of Fig. 7 showing the pulley shaft and parts associated therewith.

Referring now to the drawings, 1 is the aperture frame bearing the aperture plate 2 across which is carried the film 3 which is held in contact therewith by the gate pressure spring 4 mounted within the gate frame 5 which may be mounted in any convenient manner so as to be capable of being carried backward to permit "threading" the film which operation may be accomplished by depressing handle 6 which is suitably connected to the gate operating mechanism.

On the under part of the aperture frame 1 is journaled the sprocket shaft 7 of the film driving sprocket 8. The film is held in driving relation with sprocket 8 by idler rollers 9 and 10 which are mounted on the block 11 which is supported by the arm 12 projecting downward from the gate frame 5. Rotatably mounted in lugs 13 and 14 (Figs. 7 and 8) on the top of aperture frame 1 is the shaft 15 which carries the sprocket 16 which drives the fire shutter mechanism. Within the lug 13 is screwed a threaded bushing 17 provided with a knurled head 18. A locking nut 19 is screwed upon the threaded bushing 17 and shoulders against the lug 13. The end 20 of shaft 15 is reduced in diameter and carries the collar 21 which may be fixed on the shaft by means of the set screw 22. The bushing 17 butts against the flange member 23 which is press fitted into one end of the sprocket 16 which is fastened on shaft 15 by the pin 24. Hence the turning of the threaded bushing 17 will cause an axial displacement of the shaft 15 thereby permitting adjustment of the position of the sprocket 16 laterally. The shaft 15 has an enlarged portion against which shoulders a coil spring 26 which presses against a loose flange member 27 which is slidably mounted on shaft 15 to accommodate varying widths of film.

Fast mounted on the end of shaft 15 is a helical gear 28 which meshes with a helical gear 29 fast mounted on the pulley shaft 30 which is journaled at one end in the bracket 31 which is fastened to lug 14 and is journaled at the other end in the bearing cap 32 which is attached by screws 33 (Fig. 5) to the fire shutter frame 34.

Loosely mounted on shaft 30 is the pulley 35 which has an elongated hub 36 on the end of which is press fitted the friction collar 37.

Slidably mounted on shaft 30 is a slotted collar 38 the slotted portion of which engages the pin 39 fixed in shaft 30, thereby being rotated with the shaft. An annular flange 40 on the collar 38 loosely fits over an enlarged portion 41 of the shaft 30. Between the collars 37 and 38 is a washer 42 made of fibre or other suitable friction material. Mounted with a running fit on the hub 36 of pulley 35 is a collar 43, and fast mounted on the enlarged portion 41 of the shaft 30 is a similar collar 44. Connecting these collars 43 and 44 are three leaf springs 45 secured to the collars by screws 46. At the middle of each spring 45 is attached a centrifugal weight 47 secured by screw 48.

Between the collar 43 and the friction collar 37 is another washer 49 made of fibre or other suitable friction material. A coil spring 50 surrounds the enlarged portion 41 of shaft 30 and butts at one end against collar 44 and at the other end against the annular flange 40 of the slidable collar 38. A ball 51 takes the thrust of the shaft 30 which thrust results from its helical gear drive.

The fire shutter frame 34 attached to the aperture frame 1 by the rigid member 52 is provided with an opening 53 which may be covered by the fire shutter 54 which slides in a guide-way 55. A cover plate 56, provided with an opening which registers with the opening 53 in the fire shutter frame 34, encloses the guide-way 55 and retains the fire shutter therein. Attached to an eye 57 on the top of the fire shutter 54 is a chain 58 which passes over the roller 59 mounted near the top of the guide-way 55 and thence to the pulley 35 to which it is attached.

To retain the film 3 in operative contact with the film driven sprocket 16 there is provided an idler roller 60 (Fig. 1) which is carried on the swinging bracket 61 which is pivotally mounted on the top of the gate frame 5. The roller 60 is actuated toward the sprocket 16 by a leaf spring 62 bearing on the top of bracket 61, and the downward swing of the bracket 61 is limited by a stop member 63.

The operation of my device is as follows:

The film is threaded in the usual manner, its marginal perforations engaging the teeth on the driving sprocket 8 and on the film driven sprocket 16. As soon as the projector mechanism is started and the film begins to move, in the continuous manner characteristic of the type of projector above mentioned, the shaft 15 is rotated by the sprocket 16 thereby imparting through the gears 28 and 29 rotary movement to the pulley shaft 30. As the speed of rotation of this shaft affects the centrifugal weights 47, the springs 45 are flexed thereby drawing collar 43 toward collar 44. This movement causes pressure to be applied to each side of the friction collar 37 which, being fast on hub 36 of pulley 35, actuates pulley 35 and winds up thereon the chain 58, thereby elevating the fire shutter 54 and permitting the passage of the beam of light from the condenser system to the film. When the fire shutter has reached its position of complete elevation due to the winding up of the chain 58 no further rotation of the pulley 35 is possible and the frictional torque on the friction collar 37 has the effect of retaining the pulley 35 in static condition, thereby holding the fire shutter 54 in the elevated position. In order that this torque may not be excessive so as to cause a damaging strain of the film upon the teeth of sprocket 16, thereby possibly causing injury to the film, the spring 50 is provided with sufficient tension to assure a frictional torque only slightly in excess of the amount required to overcome the effect of gravity upon the fire shutter. As the centrifugal action at higher speeds tends to increase the displacement of the collar 43, the opposing element, namely collar 38, will back away under the yielding resistance of spring 50, thus compensating the increased displacement of collar 43 and maintaining frictional torque on pulley 35 approximately constant. Thus projection speeds can be changed abruptly without undue strain being put upon the film and without the loss of that amount of torque necessary to maintain the fire shutter in the open position.

It is obvious that if film movement is stopped by the stopping of the projector the centrifugal weights will immediately return to the position of rest and frictional driving torque on the pulley 35 will cease and as the pulley is free to rotate on shaft 30 the weight of the fire shutter will unwind the chain 58 therefrom and the fire shutter will drop to the closed position. The same action takes place to drop the fire shutter if the film should break accidentally at any place along the aperture plate, thus interrupting the pull of the film on sprocket 16. This safety feature is important as a stationary broken film end lying within the aperture is the most prolific source of fire hazard.

Having thus fully described my invention, what I claim is:—

1. An automatic fire shutter control mechanism for use in connection with projecting apparatus of the type wherein the movement of the film strip is not periodically interrupted comprising a fire shutter, a laterally adjustable sprocket arranged to be driven by engagement with the film carried by the projecting apparatus whereon the device is mounted, and so located as to receive its actuating influence from that portion of the film which is passing across the aperture, and fire shutter opening means operatively connected with said sprocket and adapted to be operated thereby, which means upon the rotation of said sprocket are adapted to cause said fire shutter to open, said means being adapted to release said fire shutter and permit it to return to closed position whenever said sprocket is stopped.

2. In a device of the character specified the combination of a pulley shaft, means for rotating said shaft, a shutter operating pulley loosely mounted on said shaft, a friction means adapted to apply rotative torque to said pulley, centrifugal means connected with said friction means and adapted when rotated to press said friction means into operative engagement, and a spring arranged to bear on said friction means so as to relieve excess frictional pressure produced by said centrifugal means.

3. In a device of the character specified the combination of a pulley shaft, means for rotating said shaft, said means being adapted to be actuated by engagement with the film carried by the projecting apparatus whereon the device is mounted, a shutter operating pulley loosely mounted on said shaft, a friction means adapted to apply rotative torque to said pulley, centrifugal means connected with said friction means and adapted when rotated to press said friction means into operative engagement, and a spring arranged to bear on said friction means so as to relieve excess frictional pressure produced by said centrifugal means.

4. In a device of the character specified the combination of a pulley shaft, means for rotating said shaft, a shutter operating pulley loosely and slidably mounted on said shaft, a friction member fast mounted on the hub of said pulley, a second friction member slidably mounted on said shaft and rotating therewith, centrifugal means arranged to actuate said first mentioned friction member toward and against said second friction member and a spring arranged to bear on said second friction member and yieldingly support it against the pressure of said first mentioned friction member.

5. In a device of the character specified the combination of a pulley shaft, means for rotating said shaft, a shutter operating pulley loosely and slidably mounted on said shaft, a friction collar fast on the hub of said pulley, a second collar slidable along said shaft and rotatable thereby, a third collar loosely mounted on the hub of said pulley, a centrifugal means connected with said third collar and adapted to actuate the same toward said second collar and thereby apply pressure to said friction collar so as to impart to it torque from said second collar and a spring arranged to bear upon said second collar and yieldingly support it.

6. In a device of the character specified the combination of a pulley shaft, means for rotating said shaft, said means being adapted to be actuated by engagement with the film carried by the projecting apparatus whereon the device is mounted, a shutter operating pulley loosely and slidably mounted on said shaft, a friction collar fast on the hub of said pulley, a second collar slidably mounted on said shaft and rotatable thereby, a third collar loosely mounted on the hub of said pulley between said pulley and said friction collar, a fourth collar fast mounted on said shaft, a plurality of leaf springs attached to and connecting said third and fourth collars, centrifugal weights attached to said leaf springs, a coil spring surrounding said shaft and arranged to butt at one end against said second collar and means for maintaining the other end of said coil spring in fixed position.

In witness whereof I have hereunto affixed my signature.

ARTHUR J. HOLMAN.